Patented Oct. 22, 1946

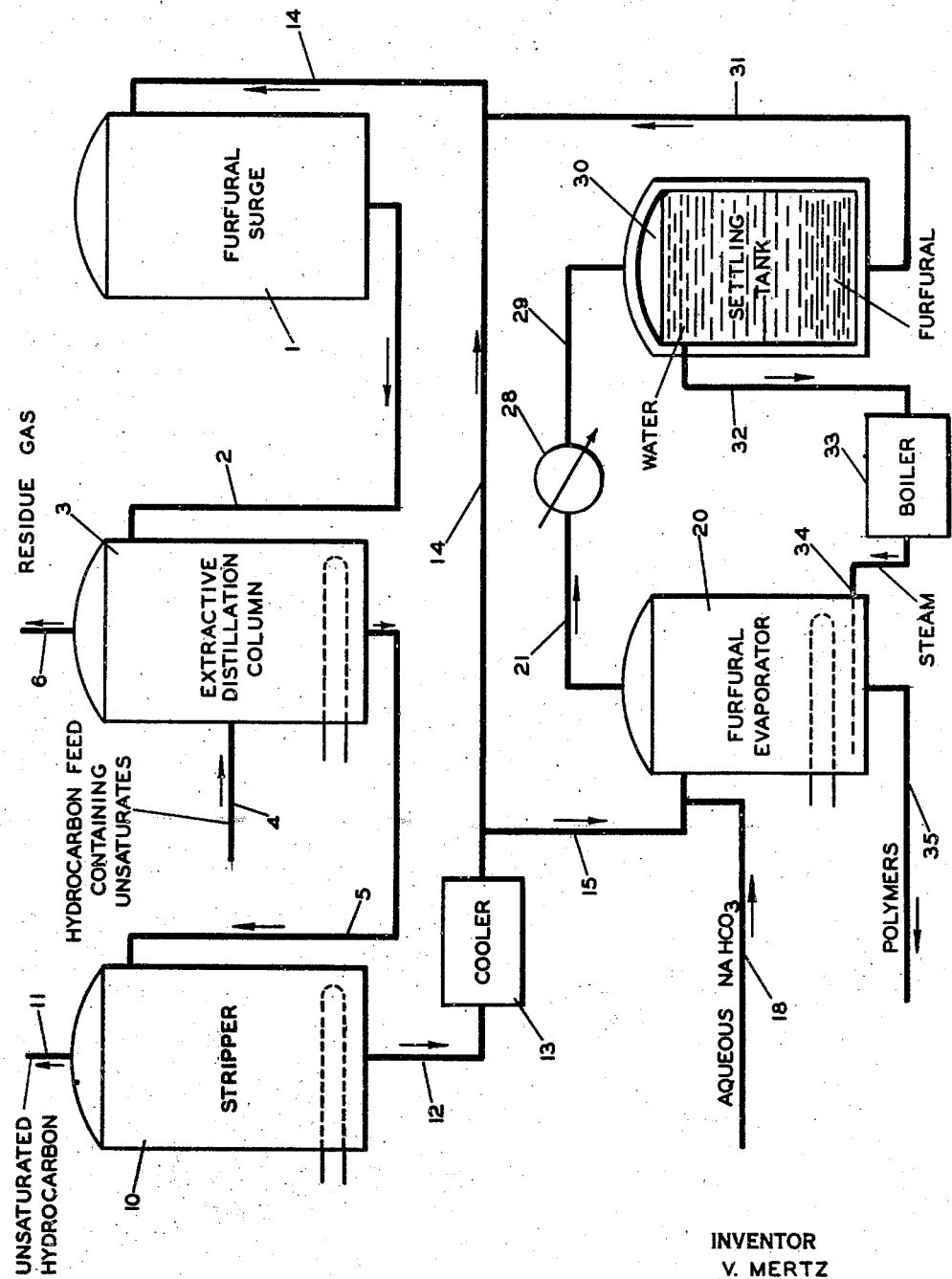

2,409,781

UNITED STATES PATENT OFFICE 2,409,781

REDUCING CORROSION AND POLYMERIZATION OF FURFURAL IN EXTRACTIVE DISTILLATION PLANTS

Valentine Mertz, Dallas, Tex., assignor to Phillips Petroleum Company, a corporation of Delaware Application August 6, 1945, Serial No. 609,208

7 Claims. (Cl. 196—13)

My invention relates to improvements in chemical treatment of furfural in extractive-distillation systems. In one particular aspect it relates to a method of minimizing polymerization of such furfural and in another particular aspect it relates to a method of minimizing corrosiveness of furfural in such systems.

Furfural is widely used as a solvent in extractive distillation processes wherein unsaturated hydrocarbons are separated from paraffins, and is especially useful in separating butadiene and/or other unsaturated hydrocarbons from saturated hydrocarbons of similar boiling range. The principal disadvantages to the use of furfural in such processes lie in the tendencies of furfural to polymerize during such use and to become extremely corrosive. Such polymerization results in loss of furfural, fouling of heating equipment by accumulation of polymers thereon, fouling and plugging of lines and constricted-portions of the equipment and loss of the property of selective absorption for unsaturates normally possessed by furfural. It has been a principal teaching of the prior art that polymer formation in the furfural in such systems is an autocatalytic process and it has been customary to redistill a large portion of the furfural so used in order to remove the polymers formed before returning the furfural to the extractive distillation system.

As the furfural is used in such extractive-distillation system it becomes very corrosive. The nature or origin of the corrosive impurities which develop in such furfural is not understood. Since such furfural becomes more acidic during use many attempts to correlate the corrosiveness of the furfural with its acid content have been made but without success. As an example of such attempts it has been found that samples of furfural, withdrawn from the process streams of extractive distillation plants, which had an acid content of .02% were extremely corrosive whereas other samples so withdrawn had an acid content of .06% and were non-corrosive. As examples of the confusing results formerly obtained in testing the corrosiveness of furfural the following are submitted:

Example I

The corrosiveness of furfural was tested by placing metal test specimens in contact with furfural in a glass distilling flask, refluxing the same for a definite period of time, withdrawing the test specimens, examining and weighing said specimens. Results obtained by this method were:

1. New furfural from manufacturer showed negligible corrosion.
2. New furfural, rerun in plant rerun equipment, showed negligible corrosion.
3. Used furfural from the extractive distillation plant system showed appreciable corrosion. However, corrosion did not increase when the acid concentration of each plant sample was increased by heating same.
4. Heating non-corrosive furfural in the presence of air or carbon dioxide did not render such furfural corrosive.

Example II

A second method used for testing the corrosiveness of furfural was that of placing measured quantities of furfural in glass distilling apparatus in contact with metal test specimens and steam distilling said furfural. Results obtained by this method were:

1. New furfural from manufacturer showed appreciable corrosion.
2. New furfural, after being steam distilled, showed negligible corrosion.
3. Used furfural from the extractive distillation system after being redistilled showed negligible corrosion.
4. New furfural after simple distillation showed negligible corrosion.
5. Used furfural from the extractive distillation system showed slight corrosion but materially less than that shown by new furfural.

Corrosion of equipment in extractive distillation systems is not evenly distributed throughout the system but is localized at points where the velocity of the furfural stream is increased. Pump impellers, motor valves, constrictions, heat exchangers, etc., are especially affected while there is little corrosion in fractionating towers, tanks, straight pipe and similar equipment. From this fact and, from the examples given above it is believed that the prior art concerning furfural corrosion is devoid of any rational theory as to the cause of such corrosion. I, therefore, do not wish to confine or limit my invention to any theory or mechanism of chemical action.

One object of my invention is to provide a method whereby polymerization of furfural in extractive distillation systems is minimized.

Another object of my invention is to provide a method for decreasing the corrosiveness of furfural used in extractive distillation systems.

Another object of my invention is to provide a method which will reduce the cost of operating and maintaining extractive distillation plants using furfural.

Numerous other objects and features of novelty will become apparent to those skilled in the art upon reference to the accompanying specification, claims and drawing which show an illustrative embodiment of my invention.

My invention comprises the discovery that there is a definite pH range wherein polymerization of furfural is minimized under actual plant operation conditions; the discovery that at an overlapping pH range the corrosiveness of furfural is lessened and substantially eliminated; and a simple method for maintaining the furfural in extractive distillation systems within the overlapping portion of the above mentioned pH ranges by continuous, controlled addition of an alkaline material selected from a group composed of the bicarbonates of the alkali metals.

It has been well known that furfural polymerizes rapidly in the presence of alkali, i. e., at pH 7.0 and above. It has also been taught in the prior art that furfural polymerization is an autocatalytic process but I have discovered that this does not hold true for actual plant operation conditions wherein the water content of the furfural, heat and pressure are maintained within narrow limits of variation. Under such conditions the rate of furfural polymer formation becomes a function of the acidity of the furfural and is very low at pH 4.0 to pH 5.2. Such rate of polymer formation is not noticeably affected by varying the polymer content of the furfural from 0.1 to 1.0 weight per cent.

I have found that maintaining the furfural in such extractive distillation systems in the pH range above pH 4.0 results in greatly lessening corrosion of the equipment and that best results are obtained at pH 4.5 and above. This is an unexpected result since all attempts to correlate the corrosiveness of furfural with its acid content have failed. It is probable that the corrosive material present in such furfural requires a certain degree of acidity for its activation but I do not know that this is true and do not wish to limit my invention to any theory or mechanism of chemical action.

I have found that it is practical to operate with the pH of the furfural at any point between 4.0 and 5.2, but I prefer to operate within the range pH 4.5 to 4.9 because the full benefit to be derived from the process is not obtained below pH 4.5 and the essential acidity of the furfural itself makes the addition of large quantities of alkaline materials necessary to maintain a pH of 5.0 or more. Such addition of large quantities of alkaline materials increases the danger of polymer formation due to localized excess alkalinity, and if the alkaline materials are introduced in aqueous solution may introduce an objectionable amount of water into the system.

I prefer to maintain the desired pH range by the addition of a bicarbonate of an alkali metal, such as sodium bicarbonate. The alkali bicarbonates may be introduced in saturated aqueous solution and have distinct advantages over hydroxides or carbonates of the alkali metals or alkaline earths when so used. Such bicarbonates are sufficiently soluble in water that the small amount of water so introduced is not objectionable; the introduction of such saturated aqueous solution does not cause the formation of an insoluble precipitate; and such saturated bicarbonate solution does not cause noticeable local increase of furfural polymer formation due to localized excess alkalinity. Use of the hydroxides of the alkali metals for neutralization of the excess acidity of such furfural is impractical because of increase in rate of furfural polymer formation caused by localized excess alkalinity and the carbonates are objectionable for such use because they cause the formation of precipitates which accumulate in the system.

I prefer to introduce the alkaline material in aqueous solution because of the ease and convenience of preparing, handling and metering the material in such form but it is obvious that such alkaline material might be introduced as a powder, slurry, or solution in nonaqueous solvent without departing from the spirit of the invention.

My invention may be further illustrated and better understood by reference to the accompanying drawing which shows diagrammatically one embodiment of this invention.

In an extractive distillation plant wherein unsaturated hydrocarbons are separated from paraffins furfural, from the furfural surge tank 1, is introduced via line 2 into the upper portion of the extractive distillation column 3. As the furfural descends in this column it is met by the ascending vaporous hydrocarbon feed, containing unsaturates, introduced via line 4 at a point lower in the fractionation column. The furfural absorbs the unsaturated hydrocarbons and is withdrawn via line 5, while the unabsorbed residue gas passes out of the system via line 6. The unsaturated hydrocarbon rich furfural is fed into the stripper column 10 via line 5. Column 10 is maintained at a temperature sufficiently high to strip the unsaturated hydrocarbons from the furfural. The unsaturated hydrocarbons are withdrawn overhead via line 11, and the furfural is removed as a kettle product via line 12, to the cooler 13 where it is cooled to prevent further polymerization. Cooler 13, by connections not shown, may be operated as an indirect heat exchanger. On leaving cooler 13 the furfural stream is branched, one portion being returned to the furfural surge tank 1, through line 14 while another portion is led to the furfural evaporator 20, in the furfural purification unit, through line 15.

Saturated aqueous sodium bicarbonate is fed through line 18 into line 15 at or near the point where the latter enters evaporator 20. Furfural is steam distilled in evaporator 20 and the overhead vapors are led via line 21 to condenser 28, and the condensate flows to the settling tank 30 through line 29. In tank 30 purified furfural settles to the bottom and is returned to the furfural surge tank 1 via lines 31 and 14. Water saturated with furfural is withdrawn from the aqueous layer in the settling tank 30 and is fed to boiler 33 by line 32. Boiler 33 generates steam to feed the open steam line in evaporator 20.

The furfural purification unit is operated in this manner until the polymer content of the furfural is brought to about 0.1%. When this result is reached the heating and introduction of steam into evaporator 20 are discontinued but the addition of saturated aqueous sodium bicarbonate solution through line 18 is continued. Under such operating conditions the evaporator 20 and condenser 28 serve merely as enlargements of lines 15 and 21 wherein the aqueous sodium bicarbonate solution is intimately blended with the furfural before passing on to the settling tank 30 wherein the water so introduced as solution medium is separated from the furfural.

When the polymer content of the furfural increases to 1.0% steam distillation in evaporator 20 is resumed and the cycle of operations is repeated.

The above described method of operation offers many advantages. The alkaline solution is introduced into the furfural stream at a point where the furfural is relatively cool thereby avoiding polymerization of furfural caused by slight local excess alkalinity accompanying high temperatures. The sodium bicarbonate solution enters the evaporator 20 mixed with a stream of furfural whereby the bicarbonate solution is immediately diluted and thoroughly dispersed thus avoiding local excess alkalinity. Water so introduced as solution medium is removed in settling tank 30 and does not circulate in the extractive distillation unit where its presence would be objectionable. The complete cycle of operation results in the neutralization of acidic materials in the furfural evaporator 20, where the effects of such acidic materials would be increased by concentration while distillation is being carried on, and in forming mildly alkaline supernatent water layer in the settling tank 30 by carry over of sodium bicarbonate when distillation is interrupted. Since all furfural entering tank 30 arrives via line 29 whether distillation is being used or not it is subjected to a mildly alkaline rinse before settling to the bottom of tank 30 and withdrawal therefrom by line 31, thus subjecting the condensate from the furfural distillation to treatment by alkali and extracting any water soluble salts so formed.

*Example III*

In an extractive distillation plant for butadiene manufacture, arranged as shown in the drawing, 3,000 gallons of furfural are maintained in the system. A side stream of 25 gallons per hour is withdrawn from line 14 via line 15 to the furfural evaporator 20. Approximately one gallon per hour of saturated aqueous sodium bicarbonate solution is added via line 18, metered by conventional means and varied from time to time as necessary in order to maintain the furfural within the range of pH 4.5 to 4.9. Under such conditions this plant has run continuously for several months with negligible corrosion and decreased loss of furfural as polymers. It is necessary to run the evaporator 20 as a distilling unit only 2 days per week in order to maintain the polymer content of the furfural between 0.1 and 1.0%

Formerly this plant operated without such furfural purification system. When the furfural reached a polymer content of 8.0% all the furfural was withdrawn for purification by distillation. Such intermittent operation is now unnecessary and greatly increased efficiency of unsaturated hydrocarbon absorption has been obtained, due to continuous low polymer content of the furfural.

Having described my invention and one illustrative embodiment thereof and explained its operation, I claim:

1. In the art of extractive distillation the improvement which consists of preventing corrosion of equipment and polymerization of furfural used as selective solvent by adding an alkaline material, selected from a group composed of the bicarbonates of the alkali metals, at a controlled rate and continuously to such furfural used as selective solvent and maintaining the acidity of said furfural in the range of pH 4.0 to pH 5.2.

2. The process of claim 1 wherein the alkaline material used is sodium bicarbonate.

3. In the art of separating unsaturated hydrocarbons from saturated hydrocarbons by extractive distillation the improvement which consists of decreasing corrosion of equipment and polymerization of furfural used as selective solvent by adding an alkaline material selected from a group composed of the bicarbonates of the alkali metals at a controlled rate and continuously to such furfural used as selective solvent and maintaining the acidity of such furfural within the range of pH 4.0 to pH 5.2.

4. The process of claim 3 wherein the alkaline material is sodium bicarbonate.

5. The process of claim 3 wherein the range of acidity maintained is from pH 4.5 to pH 4.9.

6. In a continuous process of extractive distillation of hydrocarbons wherein furfural is used as selective solvent for the absorption of unsaturated hydrocarbons, such selectively absorbed hydrocarbons are stripped from said furfural by distillation, the resulting stripped furfural is divided into two streams, namely a first stream and a second stream, said first stream is recycled to said absorption step, said second stream is distilled in a distillation zone wherein furfural and water are removed as overhead product while higher boiling materials are removed as a bottoms product, said overhead products are separated into aqueous and furfural layers and said furfural layer is recycled to said absorption step, that improvement which comprises: continuously adding at controlled rate an alkaline material selected from the group composed of bicarbonates of the alkali metals to said second stream prior to the entrance of said stream into said distillation zone; and controlling the relative volumes of said first and second streams and the rate of addition of alkaline material to maintain the furfural in the system within the acidity range from pH 4.0 to 5.2.

7. The process of claim 6 wherein the alkaline material is sodium bicarbonate and the acidity range is pH 4.5 to pH 4.9.

VALENTINE MERTZ.